(12) United States Patent
Patel

(10) Patent No.: US 6,904,144 B1
(45) Date of Patent: Jun. 7, 2005

(54) IMPEDANCE COMPENSATION IN INTERFACING A MODEM TO A TELEPHONE LINE

(75) Inventor: Ketankumar B. Patel, Lake Forest, CA (US)

(73) Assignee: Silicon Laboratories, Inc., Austin, TX (US)

( * ) Notice: Subject to any disclaimer, the term of this patent is extended or adjusted under 35 U.S.C. 154(b) by 626 days.

(21) Appl. No.: 09/962,779

(22) Filed: Sep. 25, 2001

(51) Int. Cl.[7] .......................... H04M 1/00; H04M 9/00
(52) U.S. Cl. ...................................... 379/394; 379/398
(58) Field of Search ................................ 379/394, 398, 379/403, 404, 9.06, 27.01, 24, 30; 324/600

(56) References Cited

U.S. PATENT DOCUMENTS 5,802,169 A  *  9/1998  Frantz et al. ............... 379/398

* cited by examiner

Primary Examiner—Duc Nguyen
Assistant Examiner—Alexander Jamal
(74) Attorney, Agent, or Firm—Farjami & Farjami LLP

(57) ABSTRACT

According to a disclosed embodiment, the ideal magnitude and phase of an ideal impedance for interfacing a modem with a telephone line is determined. This ideal impedance can be determined in the presence of an external impedance load and associated circuitry, such as an ADSL modem and accompanying POTS splitter. Thereafter, a model for an interface circuit inside the modem is utilized to arrive at an appropriate impedance for an impedance network inside the interface circuit. As an example, the interface circuit can be a DAA circuit inside a V.90 modem. Then, a relationship between the ideal impedance and an input impedance of the impedance network is established. Thereafter, the impedance network is synthesized to that the relationship between the input impedance of the impedance network and the ideal impedance is in fact satisfied. The impedance network can be, for example, a circuit comprising at least one capacitor.

27 Claims, 8 Drawing Sheets

Impedance Network
(600.0 Ohm Telephone Line Impedance)

Impedance Network
(Complex Telephone Line Impedance)

IMPEDANCE COMPENSATION IN INTERFACING A MODEM TO A TELEPHONE LINE

BACKGROUND OF THE INVENTION

1. Field of the Invention

The present invention is generally in the field of data communications. More specifically, the present invention is in the field of modem communication over a telephone line.

2. Background Art

The increased demand and availability of a variety of data communications solutions has resulted in the use of different data communications devices and services, such as V.90 modems and ADSL services, over the same POTS ("plain old telephone service") telephone line. By way of background, a typical POTS telephone line has an impedance in the range of approximately 600.0 to 900.0 ohms. The input impedance of a data communications device, such as a modem, connected to a POTS telephone line needs to closely match the impedance of the POTS telephone to meet minimum regulatory return loss requirements.

When a single data communications device, such as a V.90 modem, is connected to a POTS telephone line, the regulatory requirements can be met by making the input impedance of the V.90 modem approximately 600.0 ohms. However, if an ADSL device, such as an ADSL modem, is also connected, via a POTS splitter, to the same POTS telephone line as the V.90 modem, the resulting input impedance of the coupled data communications devices (i.e. the ADSL modem, V.90 modem, and POTS splitter) no longer matches the POTS telephone line impedance. In fact, the return loss of the above coupled communications devices falls below the regulatory minimum requirements.

FIG. 1 shows a block diagram of an exemplary system comprising a V.90 modem, a POTS splitter, and an ADSL load. In system 100 in FIG. 1, V.90 modem 102 is connected to POTS splitter 104 via lines 116 and 118. POTS splitter 104 can be a low pass filter. POTS splitter 104 is connected to TIP terminal 108 and RING terminal 110, respectively, via lines 112 and 114. TIP terminal 108 and RING terminal 110, respectively, are connected to the tip and ring terminals of a POTS telephone line. A first terminal of ADSL load 106 is connected to TIP terminal 108, and a second terminal of ADSL load 106 is connected to a first terminal of relay 120. A second terminal of relay 120 is connected to RING terminal 110. Thus, when relay 120 is closed, ADSL load 106 is connected in parallel with POTS splitter 104 at TIP terminal 108 and RING terminal 110. As an example, ADSL load 106 can be an ADSL modem. When system 100 is connected to a telephone line at TIP terminal 108 and RING terminal 110, the input impedance looking into line 112 must closely match the telephone line impedance for the return loss of system 100 to meet regulatory requirements.

When V.90 modem 102 is connected directly to a telephone line by itself, i.e. without either POTS splitter 104 or ADSL load 106 connected to the same telephone line, the input impedance of V.90 modem 102 must closely match the telephone line impedance for the return loss of V.90 modem 102 to meet regulatory requirements. This means that, for modems utilizing a Data Access Arrangement ("DAA") circuit to interface with a telephone line, the input impedance of the DAA circuit must closely match the telephone line impedance. For example, to meet a desired telephone line impedance of 600.0 ohms, the DAA circuit inside V.90 modem 102 needs to have an input impedance that is close enough to 600.0 ohms to meet regulatory return loss requirements. However, in system 100, with POTS splitter 104, ADSL load 106, and V.90 modem 102 connected to the same telephone line, the combined impedance of POTS splitter 104, ADSL load 106, and V.90 modem 102 deviate from the telephone line impedance sufficiently such that the return loss of system 100 does not meet regulatory requirements. For example, FIG. 2 shows a graphical comparison of the simulated return loss of system 100, represented by waveform 204, and the minimum required return loss, represented by dashed line 202, for a 600.0 ohm impedance telephone line.

As seen in FIG. 2, waveform 204, representing the simulated return loss of system 100, falls below dashed line 202, representing the required return loss, in the 0.0 to 4.0 kHz frequency range, i.e. the frequency range where the return loss of system 100 is required to be above 20.0 dB. Thus, even when the input impedance of V.90 modem 102 can sufficiently match a telephone line impedance to enable V.90 modem 102 to meet regulatory return loss requirements, the input impedance of V.90 modem 102 combined with additional impedances of POTS splitter 104 and ADSL load 106 result in system 100 not meeting regulatory return loss requirements.

Thus, there is need in the art for impedance compensation to interface a modem to a telephone line in the presence of an external impedance load, such as an ADSL load, in order to meet regulatory return loss requirements.

SUMMARY OF THE INVENTION

The present invention is directed to impedance compensation in interfacing a modem to a telephone line. The present invention overcomes the need in the art for impedance compensation in interfacing a modem to a telephone line in the presence of additional communications devices and associated circuitry, such as an ADSL load and POTS splitter, in order to meet regulatory requirements.

According to one embodiment of the present invention, the ideal magnitude and phase of an ideal impedance for interfacing a modem with a telephone line is determined. This ideal impedance can be determined in the presence of additional circuitry, such as an ADSL modem or POTS splitter. Thereafter, a model for an interface circuit inside the modem is utilized to arrive at an appropriate impedance for an impedance network inside the interface circuit. As an example, the interface circuit can be a DAA circuit inside a V.90 modem.

Then, a relationship between the ideal impedance and an input impedance of the impedance network is established. Thereafter, the impedance network is synthesized so that the relationship between the input impedance of the impedance network and the ideal impedance is in fact satisfied. The impedance network can be, for example, a circuit comprising at least one capacitor. Utilizing the above procedures, the present invention results in meeting regulatory requirements in interfacing a modem, such as a V.90 modem to, for example, "600.0 ohm" and "complex impedance" telephone lines, while the telephone lines are loaded by an additional communications device, such as a DSL modem.

DETAILED DESCRIPTION OF THE INVENTION

The present invention is directed to impedance compensation in interfacing a modem to a telephone line. The following description contains specific information pertaining to various embodiments and implementations of the invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skills in the art.

The drawings in the present application and their accompanying detailed description are directed to merely example embodiments of the invention. To maintain brevity, other embodiments of the invention that use the principles of the present invention are not specifically described in the present application and are not specifically illustrated by the present drawings.

Figure 1:
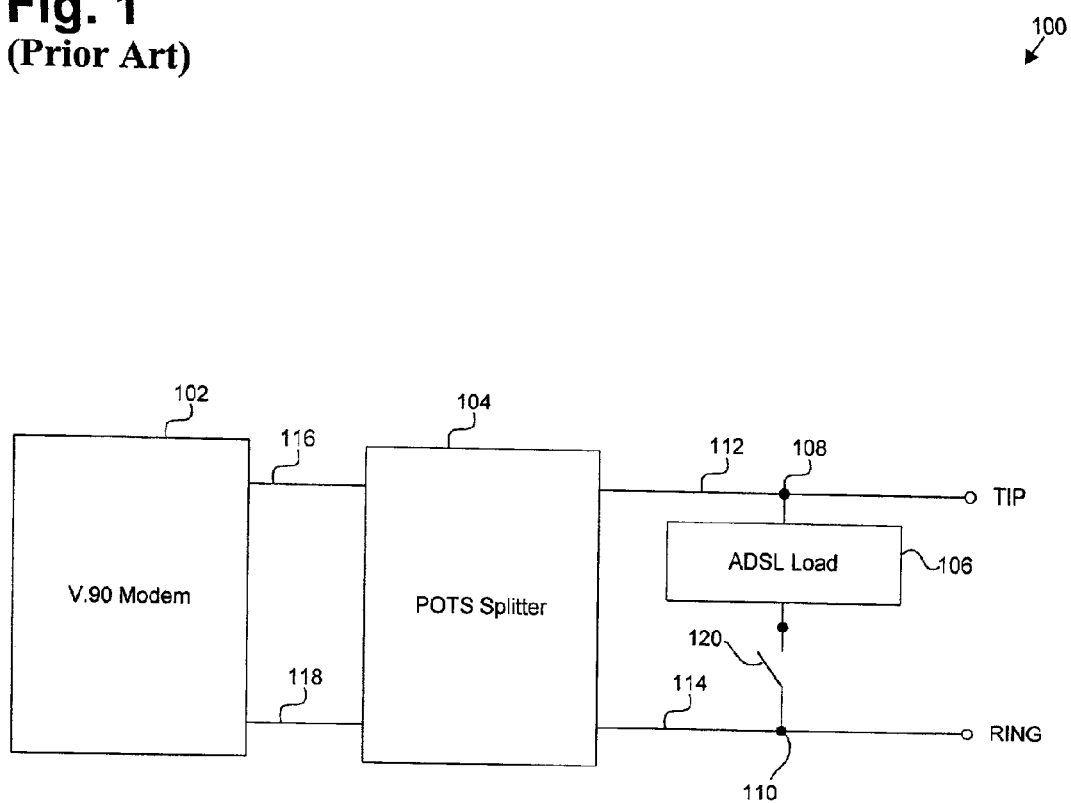
FIG. 1 illustrates a block diagram of an exemplary system including a V.90 modem, a POTS splitter, and an ADSL load connected to a telephone line.
Figure 2:
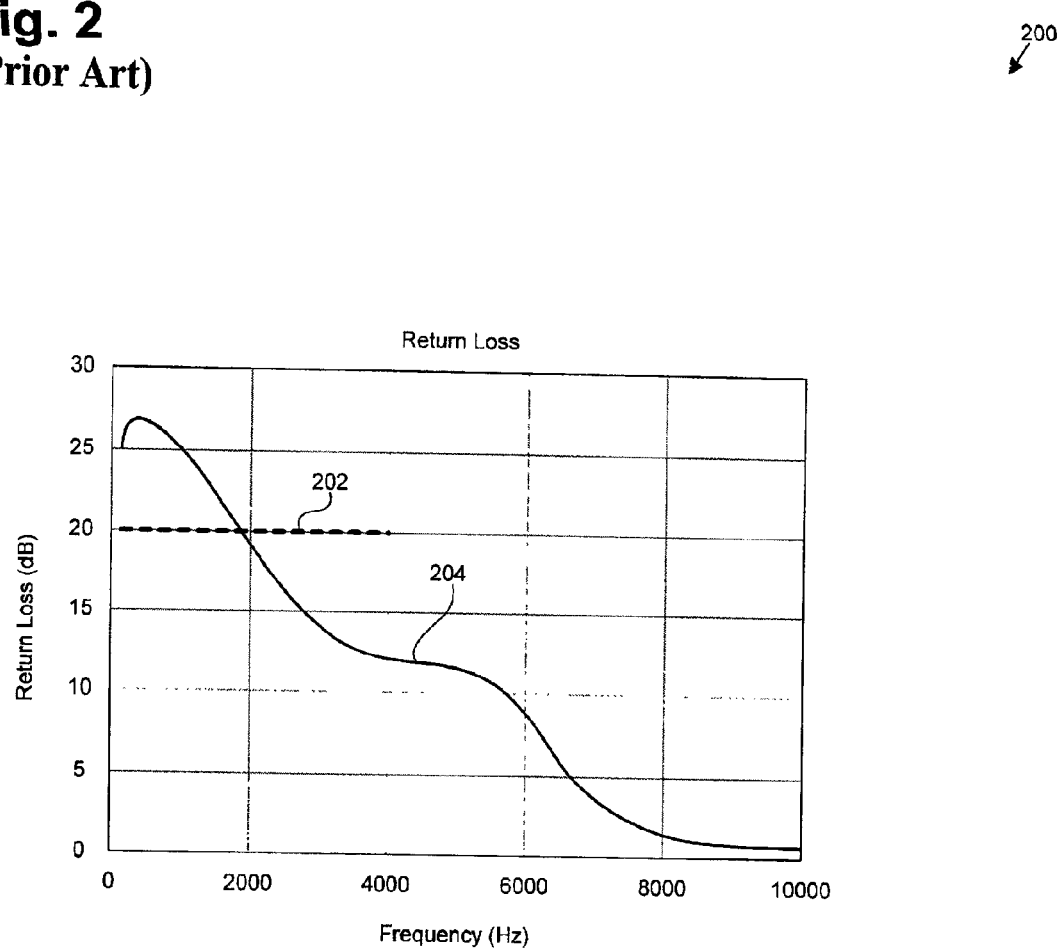
FIG. 2 illustrates waveforms representing a simulated return loss of the exemplary system in FIG. 1 without impedance compensation.
Figure 3:
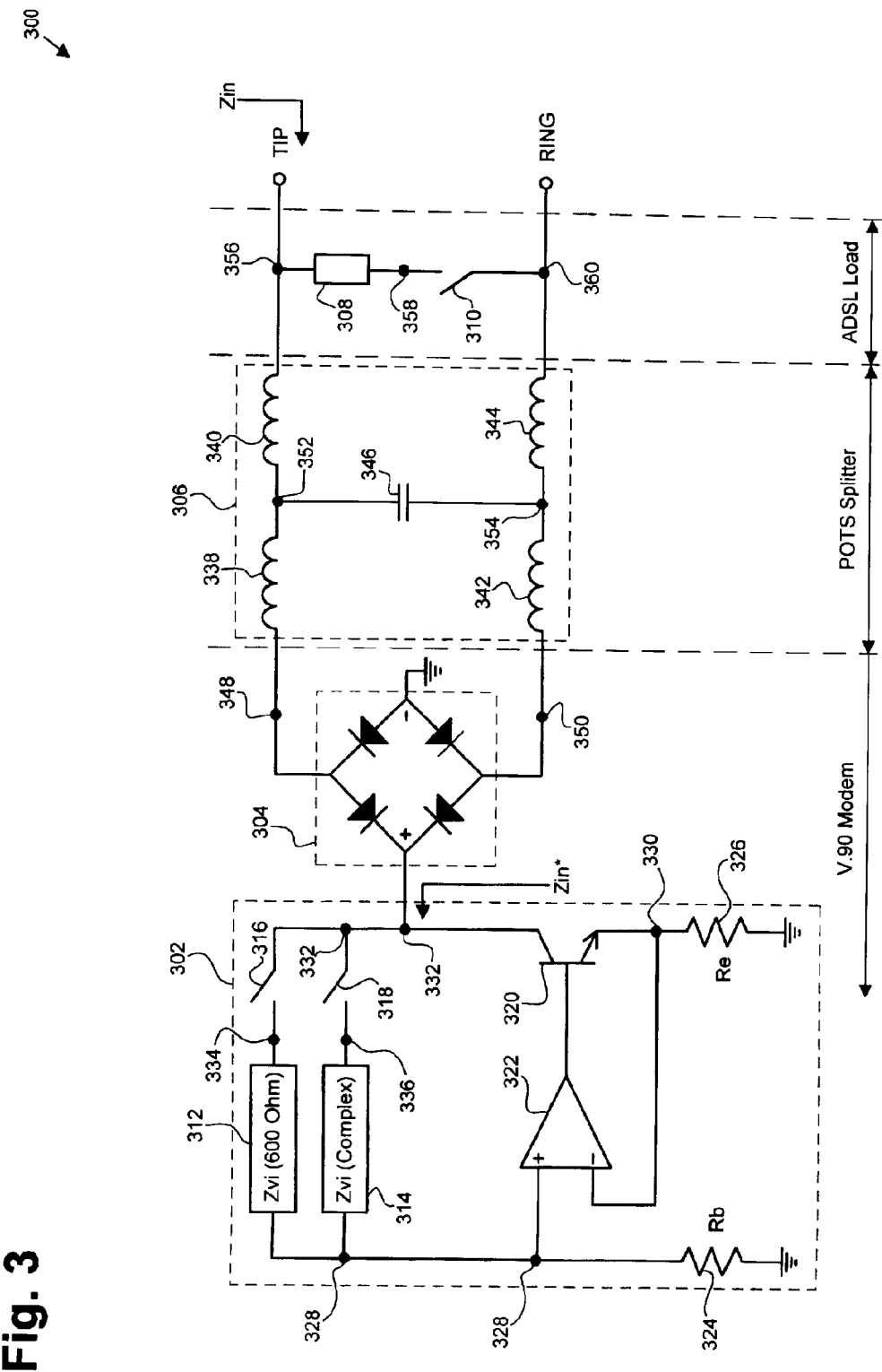
FIG. 3 illustrates a model for determining an impedance network for a DAA circuit in accordance with one embodiment of the present invention.

FIG. 3 shows a model for designing an "impedance network" inside a modem, for example a V.90 modem or a V.92 modem, which when combined with a POTS splitter and an ADSL load, presents the desired impedance to a telephone line. For the purpose of a specific example, in the present application it is assumed that the modem, such as the V.90 modem or a V.92 modem, utilizes a DAA circuit to interface with the "outside world." As such, in the present application, it is assumed that the impedance of the modem's DAA circuit, in combination with the impedances of the POTS splitter and the ADSL load, must result in a desired POTS interface impedance, i.e. an impedance which will result in meeting the regulatory requirements in interfacing with a given telephone line. The impedance of the DAA circuit is modeled and shown by dashed box 302 in impedance model 300 in FIG. 3. Dashed box 302 is referred to as "DAA circuit 302" in the description below.

Impedance model 300 comprises DAA circuit 302, diode bridge 304, filter 306, impedance load 308, and relay 310. DAA circuit 302 comprises "impedance network" 312 (also referred to as $Zvi_{600}$), "impedance network" 314 (also referred to as $Zvi_{complex}$), switches 316 and 318, NPN transistor 320, op amp ("operational amplifier") 322, resistor 324 (also referred to as "Rb"), and resistor 326 (also referred to as "Re").

A first terminal of resistor 324 is connected to the "+" input of op amp 322 at node 328, and a second terminal of resistor 324 is connected to ground. The "−" input of op amp 322 is connected to a first terminal of resistor 326 at node 330. A second terminal of resistor 326 is connected to ground. The emitter of NPN transistor 320 is also connected at node 330. The output of op amp 322 is connected to the base of NPN transistor 320. The collector of NPN transistor 320 is connected to the DC positive terminal of diode bridge 304 (shown as "+") at node 332. The DC negative terminal of diode bridge 304 (shown as "−") is connected to ground.

A first terminal of switch 316 is connected to a first terminal of impedance network 312 at node 334. A second terminal of switch 316 is connected to a first terminal of switch 318 at node 332. A second terminal of switch 318 is connected to a first terminal of impedance network 314 at node 336. A second terminal of impedance network 312 is connected to a second terminal of impedance network 314 at node 328.

Filter 306 comprises inductors 338, 340, 342, and 344, and capacitor 346. A first terminal of inductor 338 is connected to a first AC signal terminal of diode bridge 304 at node 348. A second terminal of inductor 338 is connected to a first terminal of capacitor 346 at node 352. A first terminal of inductor 340 is also connected at node 352. A second terminal of capacitor 346 to connected to a first terminal of inductor 342 at node 354. A first terminal of inductor 344 is also connected at node 354. A second terminal of inductor 342 is connected to a second AC terminal of diode bridge 304 at node 350.

A second terminal of inductor 340 is connected to a first terminal of impedance load 308 at node 356 (also referred to as TIP node 356). In the present embodiment, impedance load 308 can represent an ADSL load, such as an ADSL modem. In another embodiment, impedance load 308 can represent a different impedance load. A second terminal of impedance load 308 is connected to a first terminal of relay 310. A second terminal of relay 310 is connected to a second terminal of inductor 344 at node 360 (also referred to as RING node 360).

The function and operation of impedance model 300 in FIG. 3 will now be discussed. In impedance model 300, DAA circuit 302 is coupled to diode bridge 304 at node 332. Diode bridge 304 is in turn coupled to filter 306 at nodes 348 and 350. Filter 306 is further coupled to impedance load 308 at nodes 356 and 360. As shown in FIG. 3, an impedance load, such as an ADSL load, can be connected across TIP node 356 and RING node 360. DAA circuit 302 can model the DAA circuit of a modem, such as a V.90 or a V.92 modem. In one embodiment, DAA circuit 302 can model the DAA circuit of a SmartDAA™ V.90 modem. Diode bridge 304 can model a diode bridge circuit in a modem, such as a V.90 modem, and filter 306 can model a POTS splitter (i.e. a POTS filter). Impedance load 308 can represent (i.e. model) an ADSL load, such as an ADSL modem. In another embodiment, impedance load 308 can represent a different impedance load. Thus, for example, impedance model 300 can model a V.90 modem coupled to a POTS splitter, which is in turn connected in parallel with an ADSL modem.

In FIG. 3, Zin represents the input impedance of impedance model 300 between TIP node 356 and RING node 360. For example, a value of Zin equal to 600.0 ohms provides optimal impedance, i.e. maximum return loss, when connected to a 600.0 ohm impedance telephone line. Relay 310, when closed, connects impedance load 308, such as an ADSL load, between nodes 356 and 360, i.e. in parallel with filter 306. For example, impedance load 308 can model the input impedance of an ADSL modem. In another embodiment, impedance load 308 can model the input impedance of another communication device. Filter 306 can model a POTS splitter, for example a low pass POTS filter, by attenuating signals with frequencies above approximately 6.0 KHz, and passing signals in a voice band below 4.0 KHz. Since the cutoff frequency of filter 306 can be close to 4.0 KHz, filter 306 can produce a phase shift in the impedance presented by DAA circuit 302 to the POTS interface port (i.e. TIP node 356 to RING node 360). The phase shifts produced by filter 306 and impedance load 308 degrade the return loss of impedance model 300.

The telephone line voltage polarity at TIP node 356 and RING node 360 that is also provided to nodes 348 and 350 via filter 306 is arbitrary. However, diode bridge 304 is added to ensure that a positive voltage is always applied to DAA circuit 302 at node 332, regardless of the line voltage polarity present at TIP node 356 and RING node 360.

The function and operation of DAA circuit 302 is now discussed in relation to impedance model 300. Zin* represents the input impedance of DAA circuit 302 at node 332. The value of Zin* can be calculated by applying a test voltage "VT" to node 332 and determining a test current "IT" that will be drawn by node 332. When TIP node 356 and RING node 360 are connected to a telephone line impedance in a range of approximately 600.0 to 900.0 ohms (defined as the "600.0 ohm mode" in the present application), switch 316 is shorted to connect impedance network 312 (i.e. $Zvi_{600}$) between nodes 328 and 332. Similarly, when TIP node 356 and RING node 360 are connected to a "complex" telephone line impedance (defined as the "complex mode" in the present application), switch 318 is shorted to connect impedance network 314 (i.e. $Zvi_{complex}$) between nodes 328 and 332.

In the 600.0 ohm mode, the magnitude of the voltage at the "+" input of op amp 322 is determined by the equation:

$$V(+) = Rb/(Rb+Zvi_{600})*VT \qquad \text{equation (1)}$$

where "V(+)" is the voltage at node 328, and "VT" is the test voltage applied at node 332. The voltage ("Ve") at the emitter of NPN transistor 320 (i.e. node 330) is also equal to the right side of equation (1). "Ve" (i.e. the emitter voltage) induces a current ("IT") through "Re" (i.e. the emitter resister of NPN transistor 320). "IT" (i.e. the induced current through "Re") also flows through NPN transistor 320.

The impedance of $Zvi_{600}$ can be made very large such that very little current flows through $Zvi_{600}$ (i.e. the feedback path from node 332 to node 328). Since very little current flows through $Zvi_{600}$ (i.e. almost all of the current induced at node 332 flows through the collector of transistor 320), the collector current ("Ic") can be made equal to "IT," the current flowing though "Re." Thus, "Ic" is equal to "Ve/Re," which is determined by the following equation:

$$Ve/Re = Rb/(Rb+Zvi_{600})*(VT/Re) \qquad \text{equation (2)}$$

Since "IT" is equal to "Ic," "IT" is also equal to the right side of equation (2). Thus, since Zin* (i.e. the input impedance of DAA circuit 302 at node 332) is equal to "VT/IT," Zin* can be determined by the following equation:

$$Zin^* = Re(1+Zvi_{600}/Rb) \qquad \text{equation (3)}$$

Simplifying equation (3) results in the following equation:

$$Zin^* = \alpha + \beta * Zvi_{600} \qquad \text{equation (4)}$$

where α is a scaling factor equal to "Re," and β is a scaling factor equal to "Re/Rb." As such, equation (4) is a relationship between the input impedance of an impedance network, for example, $Zvi_{600}$, and the "ideal" or "desired" impedance, i.e. Zin*. Thus, Zin* is directly proportional to $Zvi_{600}$, the impedance of the feedback path from node 332 to node 328 in the 600.0 ohm mode. $Zvi_{complex}$ can be substituted for $Zvi_{600}$ in equation (4) to determine Zin* in the complex mode (i.e. with a complex telephone line impedance at TIP node 356 and RING node 360). The ideal magnitude and phase of Zin*, i.e. the desired input impedance of DAA circuit 302 at node 332, can be determined by simulation using impedance model 300 and a mathematical program, such as Mathcad®, by MathSoft Engineering & Education, Inc. for either the 600.0 ohm mode or the complex mode. It is noted that Zin* is also referred to as the "ideal impedance" in the present application, and DAA circuit 302 is an exemplary "interface circuit" in the present application.

Figure 4:
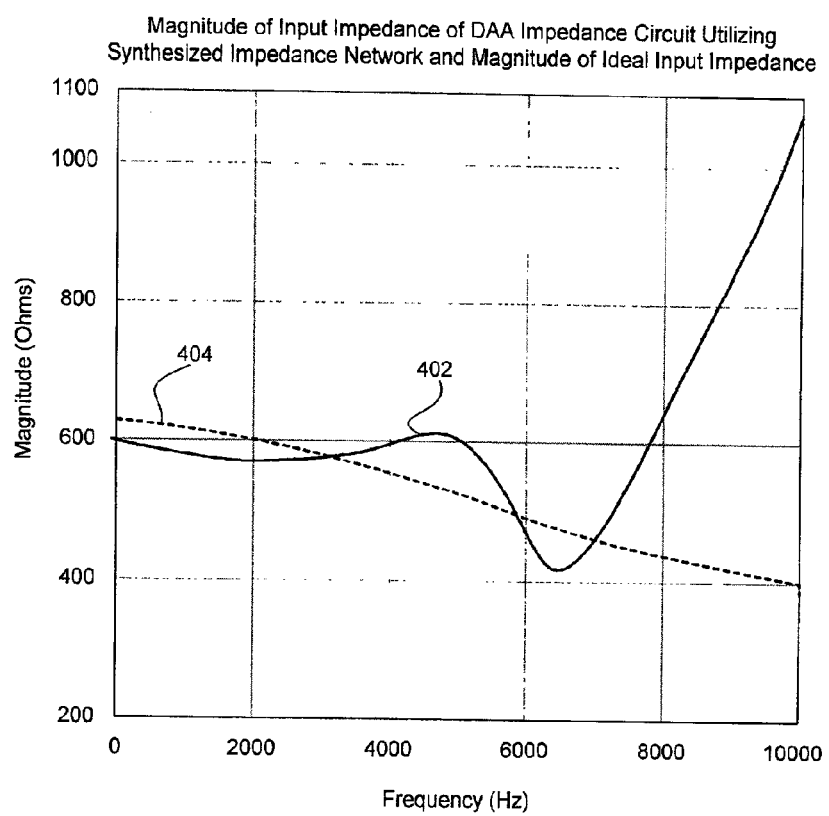
FIG. 4 illustrates waveforms representing the magnitude of the input impedance of a DAA circuit utilizing an embodiment of the present invention's impedance network.
Figure 5:
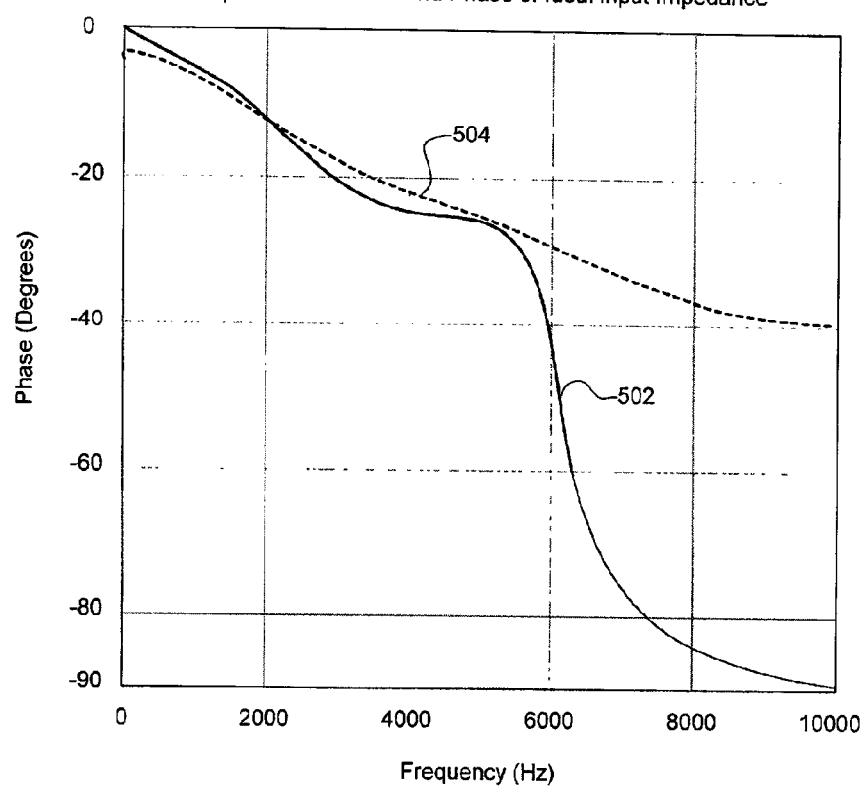
FIG. 5 illustrates waveforms representing the phase of the input impedance of a DAA circuit utilizing an embodiment of the present invention's impedance network.

Using the 600.0 ohm mode by way of an example, graph 400 in FIG. 4 shows waveform 402, which represents the ideal magnitude of Zin* plotted against frequency in the 600.0 ohm mode. As discussed above, waveform 402, i.e. the ideal magnitude of Zin*, can be determined by simulation using impedance model 300 in the 600.0 ohm mode. Similarly, graph 500 in FIG. 5 shows waveform 502, which represents the ideal phase of Zin* plotted against frequency in the 600.0 ohm mode. As discussed above, waveform 502, i.e. the ideal phase of Zin*, can also be determined by simulation using impedance model 300 in the 600.0 ohm mode.

As shown above in equation (4), Zin* is directly proportional to Zvi. Thus, once the ideal magnitude and phase of Zin* have been determined for a desired impedance at TIP node 356 and RING node 360, the present invention's impedance network, i.e. Zvi, can be accurately synthesized to match the ideal magnitude and phase of Zin*. For example, $Zvi_{600}$, the present invention's impedance network in 600.0 ohm mode, can be accurately synthesized to match waveforms 402 and 502, respectively, the ideal magnitude and phase of Zin* at a 600.0 ohm impedance at TIP node 356 and RING node 360. Thus, by establishing a relationship between Zin* and Zvi, and simulating the ideal magnitude and phase of Zin* for a desired Zin, the present invention allows Zvi to be accurately synthesized.

Figure 6A:
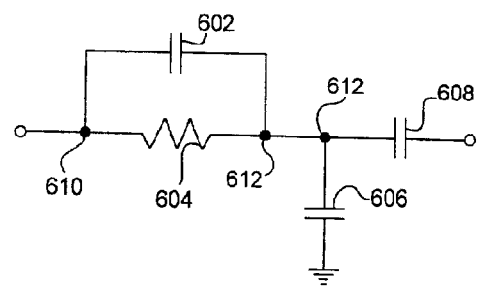
FIG. 6A illustrates a schematic diagram of an impedance network in accordance with one embodiment of the present invention.

Referring now to FIG. 6A, impedance network 600 illustrates an exemplary impedance network of a DAA circuit in accordance with one embodiment of the present invention. Impedance network 600 represents a desired impedance network that can be synthesized by using an ideal magnitude and phase of Zin* in the 600.0 ohm mode, such as waveforms 402 and 502, in equation (4) discussed above. Thus, impedance network 600 represents one implementation of $Zvi_{600}$, the present invention's impedance network in the 600.0 ohm mode. However, it is manifest to one skilled in the art that many other implementations of $Zvi_{600}$ can be synthesized from the ideal magnitude and phase of Zin* in the 600.0 ohm mode and by utilizing equation (4).

In impedance network 600, a first terminal of capacitor 602 is connected to a first terminal of resistor 604 at node 610, also referred to as a first terminal of impedance network 600. A second terminal of capacitor 602 is connected to a second terminal of resistor 604 at node 612. For example, the value of capacitor 602 can be approximately 68.0 picofarads ("pF"), and the value of resistor 604 can be approximately 348.0 kilo ohms.

A first terminal of capacitor 606 is connected to a first terminal of capacitor 608 at node 612. A second terminal of capacitor 606 is connected to ground. For example, the value of capacitor 606 can be approximately 6.8 nanofarads ("nF"). A second terminal of capacitor 608 is also referred to as a second terminal of impedance network 600. For example, the value of capacitor 608 can be approximately 47.0 nF.

Figure 6B:
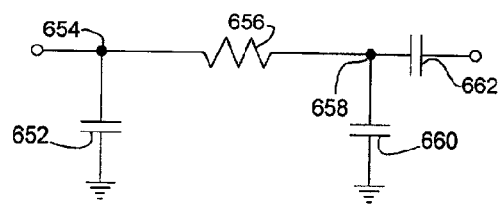
FIG. 6B illustrates a schematic diagram of an alternative impedance network in accordance with one embodiment of the present invention.

Referring to FIG. 6B, impedance network 650 illustrates an exemplary impedance network of a DAA circuit in accordance with one embodiment of the present invention. Impedance network 650 represents a desired impedance network that can be synthesized by using an ideal magnitude and phase of Zin* in the complex mode in equation (4) discussed above. Similar to impedance network 600 discussed above, impedance network 650 represents only one of many possible implementations of $Zvi_{complex}$, the present invention's impedance network in the complex mode.

In impedance network 650, a first terminal of capacitor 652 is connected at node 654, also referred to as a first terminal of impedance network 650, and a second terminal of capacitor 652 is connected to ground. For example, the value of capacitor 652 can be approximately 150.0 pF. A first terminal of resistor 656 is connected at node 654, and a second terminal of resistor 656 is connected at node 658. For example, the value of resistor 656 can be approximately 511.0 kilo ohms. A first terminal of capacitor 660 is connected to a first terminal of capacitor 662 at node 658. A second terminal of capacitor 660 is connected to ground. For example, the value of capacitor 660 can be approximately 6.8 nF. A second terminal of capacitor 662 is also referred to as a second terminal of impedance network 650. For example, the value of capacitor 662 can be approximately 47.0 nF.

Referring again to FIG. 4, waveform 404 represents the actual simulated magnitude of Zin* using impedance network 600 in impedance model 300 in the 600.0 ohm mode. Thus, as shown in graph 400, the actual magnitude of Zin* closely matches the ideal magnitude of Zin* in the frequency range of 0.0 to approximately 4.0 KHz when using synthesized impedance network 600 in impedance model 300. Referring again to FIG. 5, waveform 504 represents the actual simulated phase of Zin* using impedance network 600 in impedance model 300 in the 600.0 ohm mode. Thus, as shown in graph 400, the actual phase of Zin* also closely matches the ideal phase of Zin* in the frequency range of 0.0 to approximately 4.0 KHz when using synthesized impedance network 600 in impedance model 300.

Figure 7:
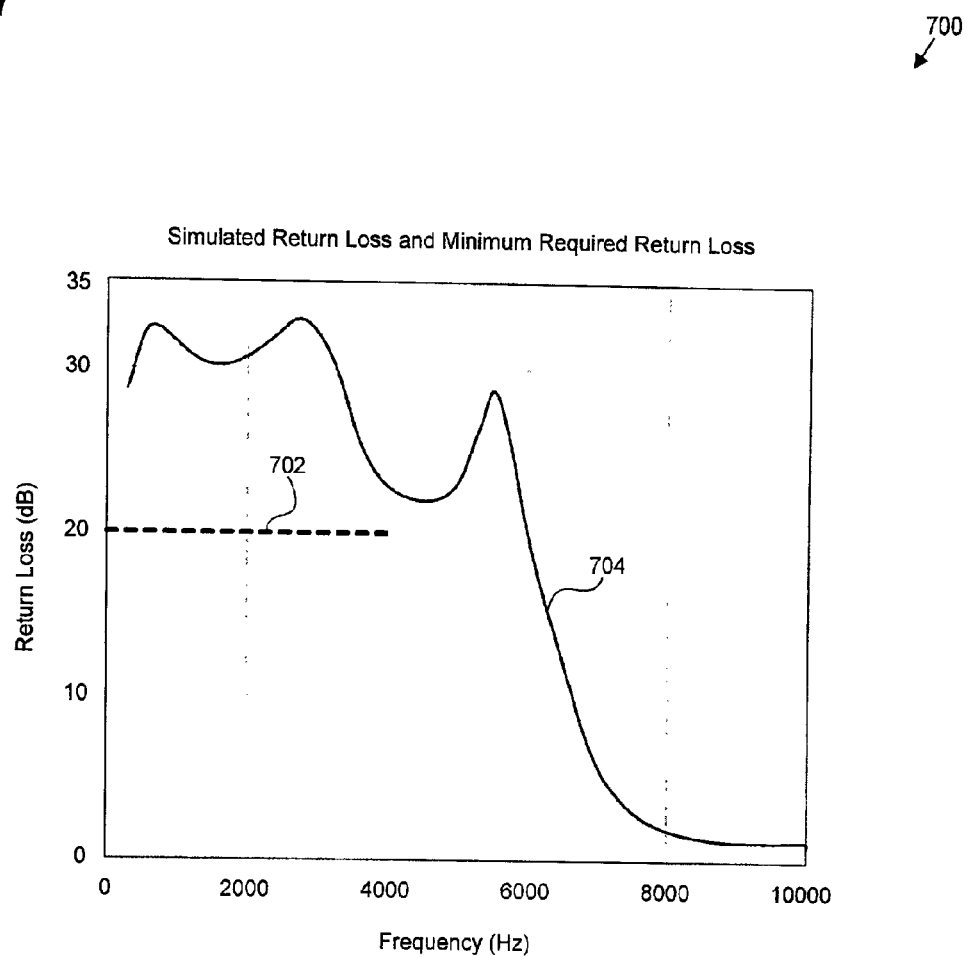
FIG. 7 illustrates waveforms representing a simulated return loss of impedance model 300 in FIG. 3 utilizing an embodiment of the present invention's impedance network.

FIG. 7 shows a graphical comparison of waveforms representing the minimum required return loss and the simulated return loss of impedance model 300 in FIG. 3 at an approximate 600.0 ohm telephone line impedance utilizing an embodiment of the present invention's synthesized impedance network. As shown in graph 700 in FIG. 7, waveform 702 represents the minimum required return loss of a device connected to tip and ring terminals of a telephone line at an impedance of approximately 600.0 ohms, plotted against frequency. Waveform 704 represents the simulated return loss of impedance model 300 in the 600.0 ohm mode using the invention's synthesized impedance network in DAA circuit 302 with an ADSL load connected between nodes 356 and 360. Thus, as shown in graph 700 in FIG. 7, the present invention's synthesized impedance network, for example, impedance network 600 in FIG. 6, produces a simulated return loss that exceeds the minimum required return loss of 20.0 dB in the frequency range of 0.0 to approximately 4.0 KHz.

Figure 8:
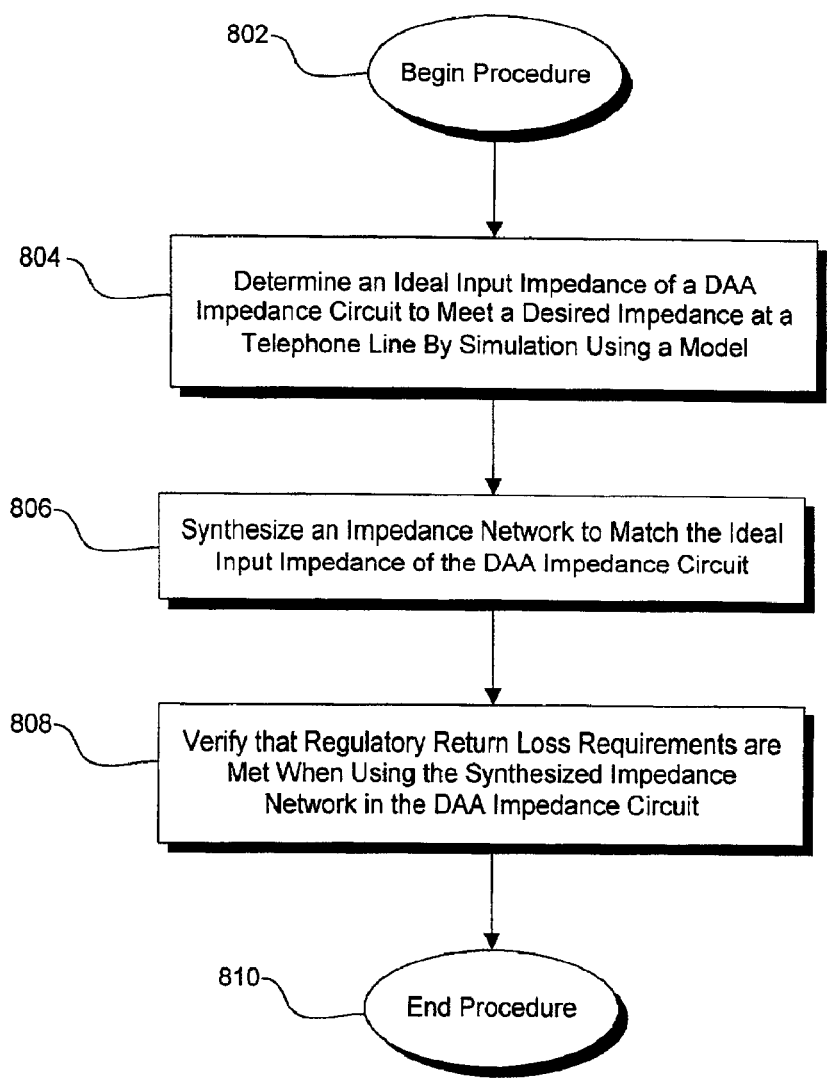
FIG. 8 illustrates a flowchart of an exemplary procedure for determining an embodiment of the present invention's impedance network in a DAA circuit.

Referring to FIG. 8, the exemplary procedure discussed above for synthesizing the present invention's impedance network is now summarized. The procedure begins at step 802. At step 804, the ideal magnitude and phase of Zin*, i.e. the input impedance of DAA circuit 302, is determined to meet, for example, a desired 600.0 ohm telephone line impedance by simulation using impedance model 300 in FIG. 3. For example, the ideal magnitude of Zin* in the 600.0 ohm mode can be represented by waveform 402 in FIG. 4. By way of another example, the ideal phase of Zin* in the 600.0 ohm mode can be represented by waveform 502 in FIG. 5.

At step 806, an impedance network is synthesized to match the ideal magnitude and phase of Zin* determined at step 804. For example, impedance network 600 in FIG. 6A can be synthesized to match the ideal magnitude and phase of Zin* at a desired telephone line impedance of 600.0 ohms at TIP node 356 and RING node 360. As shown in equation (4) above, $Zvi_{600}$, i.e. impedance network 312 in DAA circuit 302, is proportional to Zin*. Thus, the present invention determines Zin* by simulation using impedance model 300 to meet a desired telephone line impedance, such as a 600.0 ohm telephone line impedance at TIP node 356 and RING node 360. The proportional relationship between Zvi and Zin* in equation (4) above enables Zvi to be synthesized to match the ideal magnitude and phase of Zin*.

At step 808, the synthesized impedance network, such as impedance network 600 in FIG. 6A, is used in DAA circuit 302 to verify that regulatory return loss requirements are met by simulating the return loss using impedance model 300. For example, waveform 704 in FIG. 7 represents the simulated return loss with the invention's synthesized impedance network in DAA circuit 302 using impedance model 300 at a 600.0 ohm telephone line impedance. As seen in FIG. 7, the simulated return loss represented by waveform 704 exceeds the regulatory return loss represented by waveform 702 in a frequency range of 0.0 to approximately 4.0 kHz. At step 810 the procedure ends.

It is appreciated by the above detailed description that the invention provides impedance compensation in interfacing a modem to a telephone line in the presence of a POTS filter and an external impedance load, such as an ADSL modem. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention. For example, although the invention was described for an ADSL load, the invention also applies to other impedance loads. By way of another example, although the invention was described to meet the 600.0 ohm and complex mode telephone line impedances, an embodiment of the present invention can determine an impedance compensation network for any desired telephone line impedance.

Thus, impedance compensation in interfacing a modem to a telephone line has been described.

What is claimed is:

1. A method for interfacing with a telephone line, said method comprising steps of:

modeling an interface circuit including an impedance network in said interface circuit;

determining an ideal impedance for interfacing with said telephone line by simulation using said interface circuit;

determining a relationship between an input impedance of said impedance network and said ideal impedance;

synthesizing said impedance network in said interface circuit so as to substantially satisfy said relationship between said input impedance of said impedance network and said ideal impedance.

2. The method of claim 1 wherein said ideal impedance has a magnitude of approximately 600 ohms.

3. The method of claim 1 wherein said ideal impedance is a complex impedance.

4. The method of claim 1 wherein said relationship is $Zin^* = \alpha + \beta * Zvi_{600}$, wherein $Zin^*$ is said ideal impedance and $Zvi_{600}$ is said input impedance of said impedance network.

5. The method of claim 1 wherein said synthesizing step comprises a step of utilizing a network consisting of at least one capacitor to substantially satisfy said relationship between said input impedance of said impedance network and said ideal impedance.

6. The method of claim 1 further comprising a step of verifying that an actual simulated impedance of said interface circuit substantially equals said ideal impedance.

7. The method of claim 1 wherein said interface circuit is inside a modem.

8. The method of claim 7 wherein said interface circuit comprises a DAA circuit.

9. The method of claim 1 wherein said telephone line is coupled to a load impedance.

10. The method of claim 9 wherein said load impedance is an ADSL modem.

11. The method of claim 7 wherein said modem is selected from the group consisting of a V.90 modem and a V.92 modem.

12. The method of claim 11 wherein said interface circuit comprises a DAA circuit.

13. The method of claim 11 wherein said telephone line is coupled to a load impedance.

14. The method of claim 13 wherein said load impedance is an ADSL modem.

15. A method for interfacing with a telephone line, said method comprising steps of:

modeling an interface circuit including an impedance network in said interface circuit;

determining an ideal impedance for interfacing with said telephone line by simulation using said interface circuit;

determining a relationship between an input impedance of said impedance network and said ideal impedance;

synthesizing said impedance network in said interface circuit so as to substantially satisfy said relationship between said input impedance of said impedance network and said ideal impedance;

verifying that an actual simulated impedance of said interface circuit substantially equals said ideal impedance.

16. The method of claim 15 wherein said ideal impedance has a magnitude of approximately 600 ohms.

17. The method of claim 15 wherein said ideal impedance is a complex impedance.

18. The method of claim 15 wherein said relationship is $Zin^* = \alpha + \beta * Zvi_{600}$, wherein $Zin^*$ is said ideal impedance and $Zvi_{600}$ is said input impedance of said impedance network.

19. The method of claim 15 wherein said synthesizing step comprises a step of utilizing a network consisting of at least one capacitor to substantially satisfy said relationship between said input impedance of said impedance network and said ideal impedance.

20. The method of claim 15 wherein said interface circuit is inside a modem.

21. The method of claim 20 wherein said interface circuit comprises a DAA circuit.

22. The method of claim 15 wherein said telephone line is coupled to a load impedance.

23. The method of claim 22 wherein said load impedance is an ADSL modem.

24. The method of claim 20 wherein said modem is selected from the group consisting of a V.90 modem and a V.92 modem.

25. The method of claim 24 wherein said interface circuit comprises a DAA circuit.

26. The method of claim 24 wherein said telephone line is coupled to a load impedance..

27. The method of claim 26 wherein said load impedance is an ADSL modem.

* * * * *